Sept. 4, 1962 H. W. SCHMITZ 3,052,136
WINDSHIELD WIPER ACTUATING MECHANISM
Filed March 11, 1960 4 Sheets-Sheet 1

INVENTOR.
Harry W. Schmitz
BY
W. E. Finken
HIS ATTORNEY

INVENTOR.
Harry W. Schmitz
BY
W. E. Finken
HIS ATTORNEY

Sept. 4, 1962 H. W. SCHMITZ 3,052,136
WINDSHIELD WIPER ACTUATING MECHANISM
Filed March 11, 1960 4 Sheets-Sheet 3
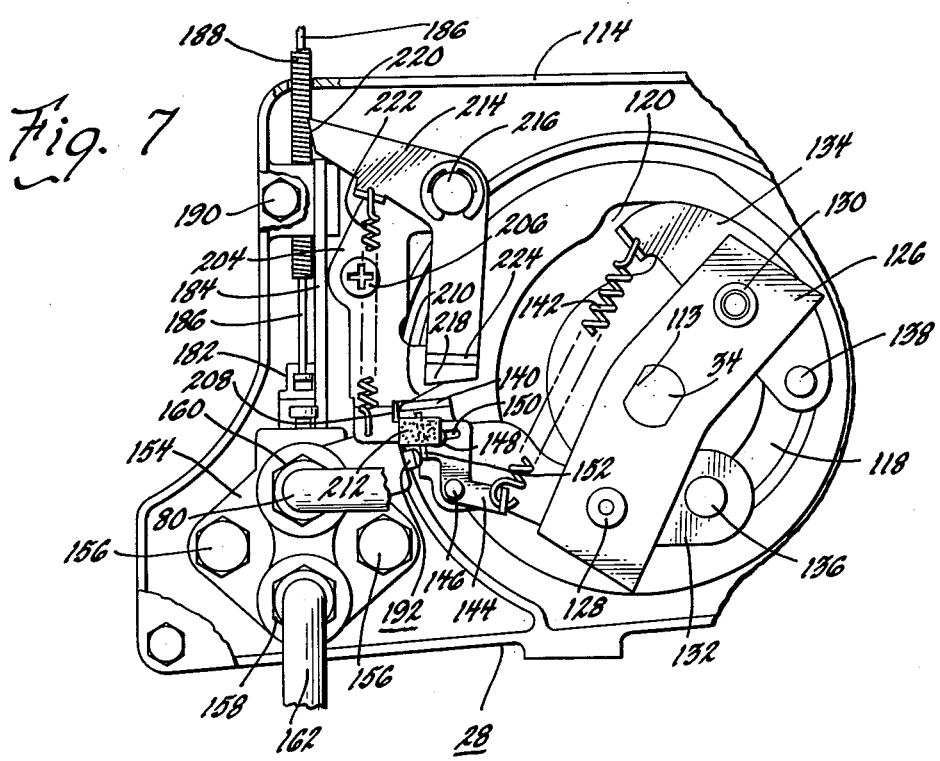
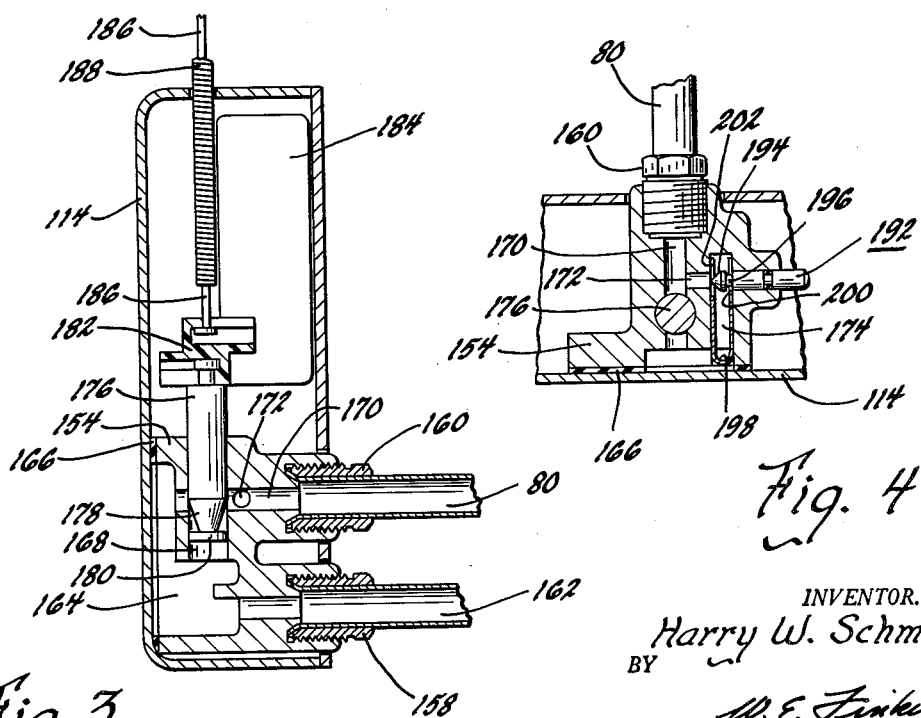
INVENTOR.
Harry W. Schmitz
BY
HIS ATTORNEY Sept. 4, 1962 H. W. SCHMITZ 3,052,136
WINDSHIELD WIPER ACTUATING MECHANISM
Filed March 11, 1960 4 Sheets-Sheet 4
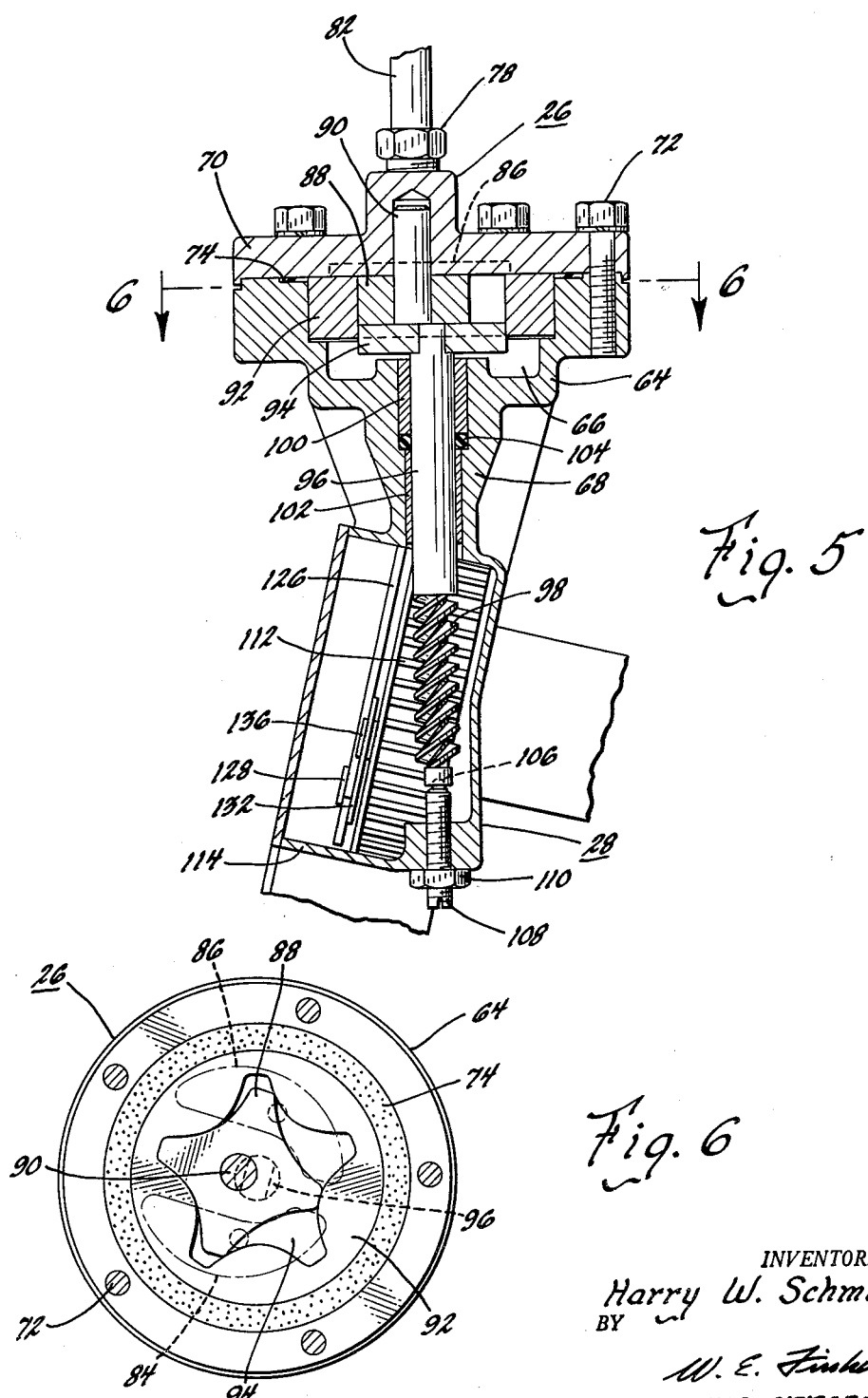
INVENTOR.
Harry W. Schmitz
BY
W. E. Fisher
HIS ATTORNEY

United States Patent Office 3,052,136
Patented Sept. 4, 1962

3,052,136
WINDSHIELD WIPER ACTUATING MECHANISM
Harry W. Schmitz, Rochester, N.Y., assignor to General Motors Corporation, Detroit, Mich., a corporation of Delaware
Filed Mar. 11, 1960, Ser. No. 14,442
11 Claims. (Cl. 74—600)

This invention relates to cleaning mechanism for vehicular windshields, and particularly to wiper actuating mechanism including a rotary hydraulic motor.

At the present time some vehicles are equipped with windshield cleaning mechanism of the type disclosed in copending application Serial No. 718,789, filed March 3, 1958, in the name of Peter R. Contant and assigned to the assignee of this invention, now Patent No. 2,985,024. This mechanism comprises a variable throw crank mechanism driven by a unidirectional electric motor together with control mechanism for the motor which is operable to automatically deenergize the motor when the wiper blades are moved to the depressed parked position. The present invention relates to a hydraulic motor and control system which can be used in lieu of the electric motor and control system disclosed in the aforementioned application. Accordingly, among my objects are the provision of a rotary hydraulic motor for actuating windshield wipers; the further provision of an hydraulic motor driven windshield wiper actuating mechanism including a variable throw crank assembly; and the still further provision of a control mechanism for hydraulic motor driven windshield wiper actuating mechanism including a variable throw crank assembly.

The aforementioned and other objects are accomplished in the present invention by embodying an automatic parking valve in the control mechanism for interrupting the supply of hydraulic fluid under pressure to the motor when the wiper blades arrive at their depressed parked positions. Specifically, the rotary hydraulic motor is of the gear type and includes a stationary reaction pinion, an internally toothed drive cap and a driven gear. The driven gear is attached to a worm shaft which imparts unidirectional rotation to a worm gear. The worm gear includes a hub rotatably journalled in a housing and has a hub with an eccentric bore therethrough within which a shaft is journalled. A driven element, or plate, is rigidly attached to one end of the shaft and a crank arm is rigidly attached to the other end of the shaft. The crank arm carries a single crank pin to which the inner ends of connecting rods are pivotally connected, the outer ends of the connecting rods being associated with linkage means for imparting asymmetrical oscillation to a pair of spaced pivot shafts.

Upon rotation of the crank, the pivot shafts are oscillated over asymmetrical paths throughout their running strokes. In order to move the wiper blades to a depressed parked position, the axis of the crank shaft is shifted to increase the throw of the crank after rotation of the crank shaft is substantially arrested. The worm gear is formed with a cam track having a pair of notches. A drive pawl and a lock pawl are pivotally mounted on the driven plate, each pawl having a pin adapted to be received in a notch in the worm gear so as to drivingly interconnect the plate with the worm gear.

The control mechanism comprises a latch arm which can be manually actuated so that the end thereof intersects the path of movement of one end of the drive pawl. When the latch engages the drive pawl during rotation of the worm gear, the driving connection between the driven plate and the worm gear will be interrupted thereby arresting rotation of the crank shaft, or driven member. Upon 180° rotation of the worm gear relative to the crank shaft, the crank shaft is shifted laterally to increase the crank throw to a maximum. When the crank throw is substantially a maximum, a lever pivotally mounted on the drive pawl engages a parking valve for interrupting the application of hydraulic fluid under pressure to the motor whereby movement of the wiper blades will be arrested in their depressed parked positions. The control mechanism also includes a manually adjustable throttle valve for controlling the speed of rotation of the hydraulic wiper motor and thus controlling the speed of oscillation of the wiper blades. The parking valve bypasses the manually operable throttle valve, and the actuator for the throttle valve controls the operation of the latch so that when the throttle valve is closed the latch is extended into the path of movement of the drive pawl.

Further objects and advantages of the present invention will be apparent from the following description, reference being had to the accompanying drawings, wherein a preferred embodiment of the present invention is clearly shown.

Figure 2:
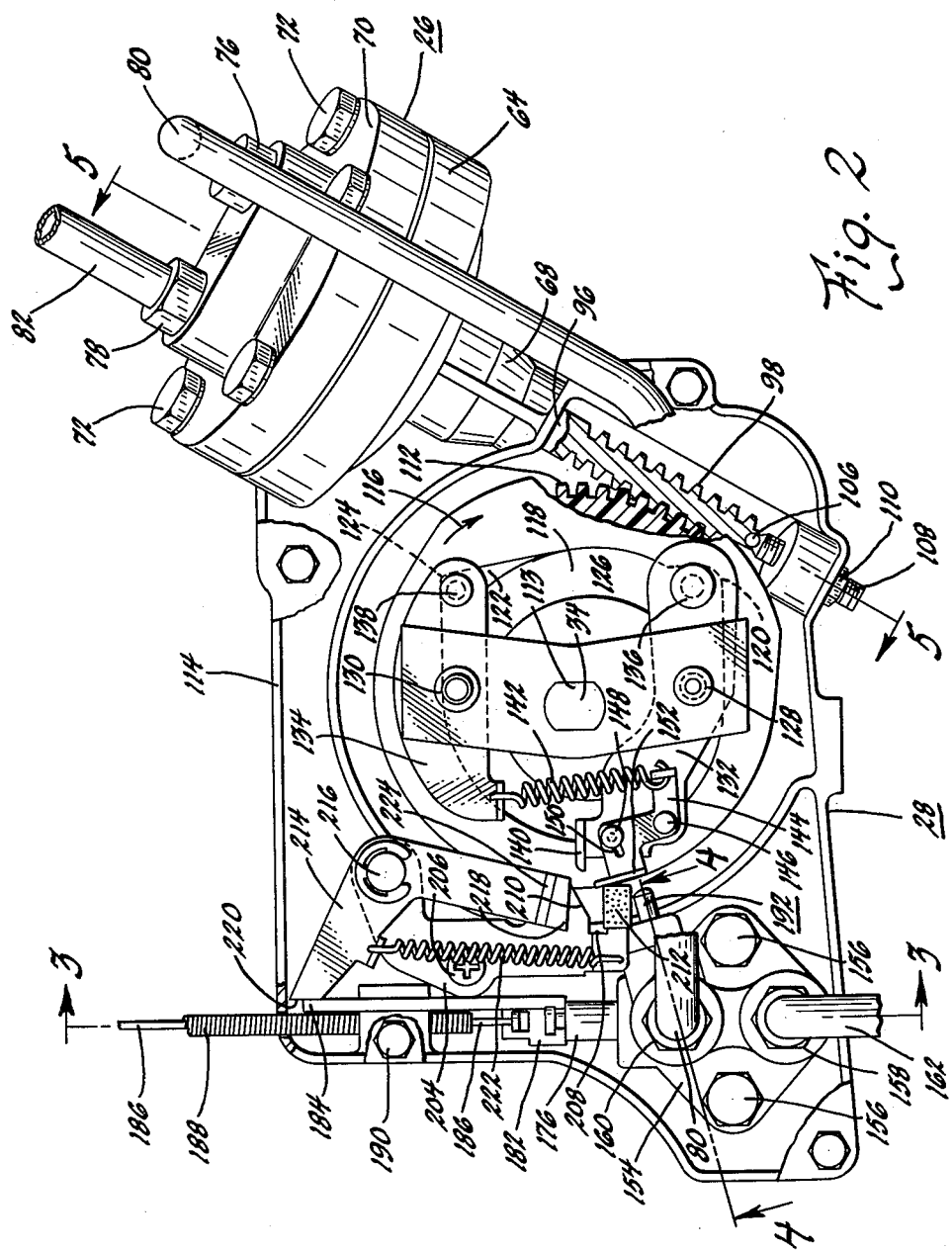
FIGURE 2 is a fragmentary view, partly in section and partly in elevation, with certain parts broken away, of the hydraulic motor and variable throw crank assembly.

FIGURES 3, 4 and 5 are fragmentary sectional views taken along lines 3—3, 4—4 and 5—5 of FIGURE 2, respectively.

FIGURE 6 is a sectional view taken along line 6—6 of FIGURE 5.

FIGURE 7 is a fragmentary view similar to FIGURE 2 showing the relationship of the parts when the crank throw has been increased to a maximum.

Figure 1:
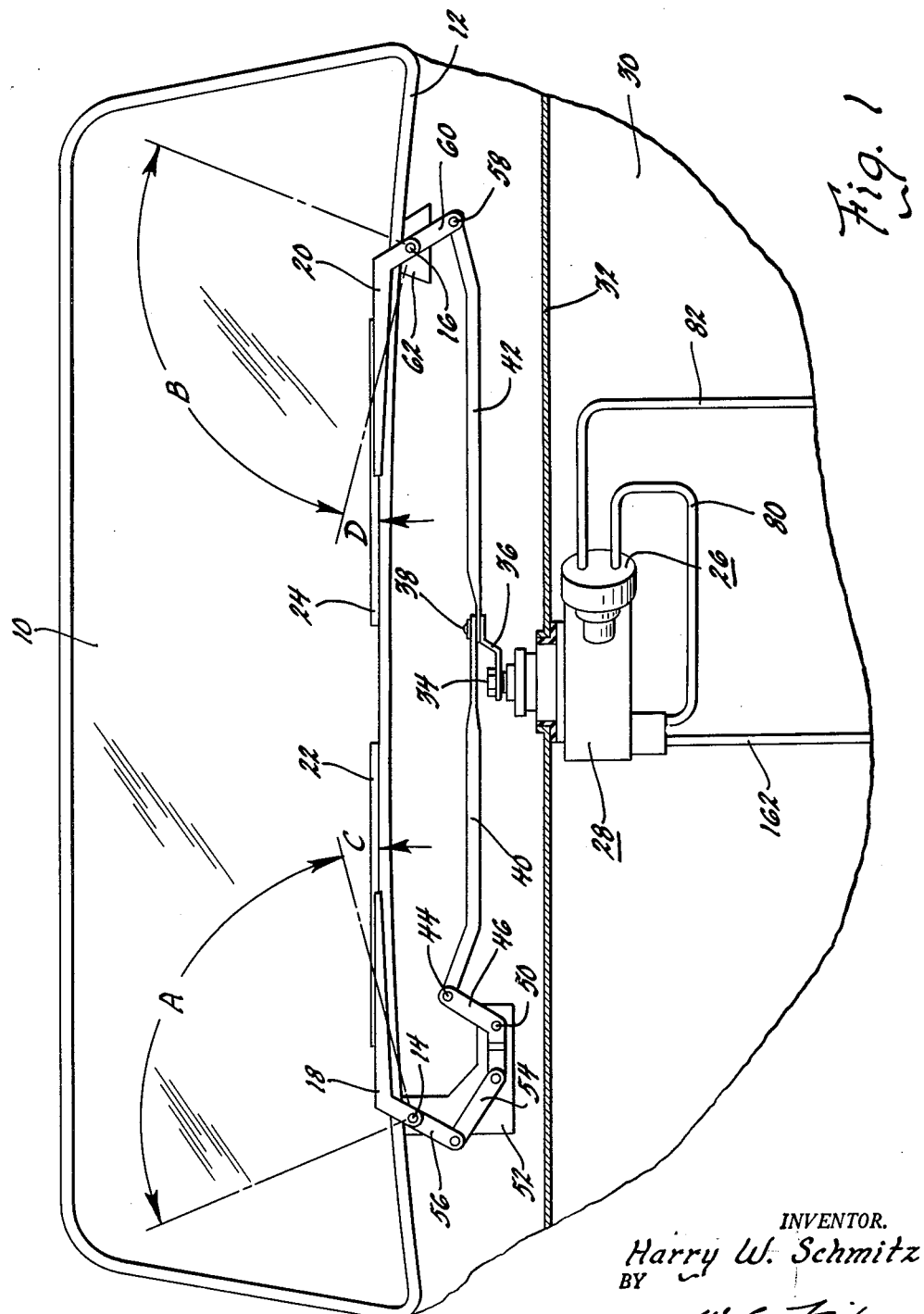
FIGURE 1 is a fragmentary view, partly in section and partly in elevation, of a vehicle equipped with the windshield cleaning mechanism of this invention.

With particular reference to FIGURE 1, a portion of a vehicle is shown including a windshield 10 having a lower reveal molding 12, a pair of spaced pivot shafts 14 and 16 being mounted beneath the lower reveal molding 12. Wiper arms 18 and 20 having spring hinge connected inner and outer sections are drivingly connected to the pivot shafts 14 and 16, respectively, and carry wiper blades 22 and 24, respectively.

The actuating mechanism for the wiper blades 22 and 24, comprising rotary hydraulic motor 26 and a gear reduction and variable throw crank assembly 28, is attached to the firewall 30 of the vehicle and extends through the lower wall 32 of the plenum chamber. The actuating mechanism includes a generally vertically extending crank shaft 34 having a single ended crank arm 36 thereto which carries a crank pin 38 adjacent its outer end. The inner ends of connecting links 40 and 42 are pivotally connected to the crank pin 38. The outer end of connecting link 40 is connected through a ball and socket joint 44 to one end of a reversing link, or bell crank, 46 having an intermediate pivot at 50 on a bracket 52 which is suitably attached to the vehicle cowl. The other end of the reversing link 46 is pivotally connected to one end of a connecting arm 54, the other end of which is pivotally connected to the outer end of a crank arm 56 attached to the pivot shaft 14. The pivot shaft 14 is journalled by suitable bearings in the bracket 52.

The outer end of the connecting link 42 is connected through a ball and socket joint 58 to the outer end of a crank arm 60 drivingly connected with the pivot shaft 16. The pivot shaft 16 is rotatably journalled in a bracket 62 suitably attached to the cowl of the vehicle. The wiper blades 22 and 24 are oscillated during rotation of the crank arm 36 throughout running strokes A and B, and are also movable throughout parking strokes C and D, respectively, to depressed parked positions wherein the blades 22 and 24 firmly engage the lower reveal molding 12.

With particular reference to FIGURES 2, 5 and 6, the rotary hydraulic motor 26 includes a cylinder 64 having a gear chamber 66 and a shaft supporting section 68. The gear chamber 66 is closed by a cover 70 attached to the cylinder 64 by a plurality of bolts 72, a suitable gasket 74 being disposed between the cover and the cylinder. The cover 70 has a pair of fittings 76 and 78 threadedly connected therewith to which conduits 80 and 82 are connected. Conduit 80 is the inlet conduit and conduit 82 is the drain conduit. The cover 70 is formed with a pair of substantially kidney-shaped ports 84 and 86 having communication with the conduits 80 and 82, respectively, as shown in phantom in FIGURE 6. A four-toothed rotatable reaction pinion 88 is located on a stub shaft 90, the stub shaft 90 being press fitted in the cover 70. A gear 92 having five internal teeth is suitably supported in the gear chamber 66. A five tooth drive cap 94 meshes with the internally toothed gear 92.

The drive cap 94 is rigidly attached to one end of an output shaft 96 having an integral worm 98 adjacent its other end. The shaft 96 is journalled in the tubular extension 68 of the cylinder by a pair of spaced sleeve bearings 100 and 102, a suitable O-ring seal 104 being arranged between the sleeve bearings. The end of the shaft 98 carries a thrust ball 106 engaged by the end of a stud 108 threadedly engaging the tubular extension 68. The stud 108 constitutes an end play adjustment means for the shaft 96. After the stud 108 is adjusted, it is locked in position by a nut 110. When fluid under pressure is supplied to the inlet port 84 through conduit 80 with the outlet port 86 connected to drain through conduit 82, rotation will be imparted to the gear 92 so as to drive the cap 94 and rotate the shaft 96.

The worm 98 meshes with a worm gear 112 suitably journalled in a housing 114 which is integral with the cylinder 64. The worm gear 112 is rotated in the direction of arrow 116 in FIGURE 2. The worm gear 112 constitutes the driving member of the variable throw crank assembly which is of the type disclosed in the aforementioned copending application Serial No. 718,789. The variable throw crank assembly, per se, constitutes no part of the present invention, and hence the detail construction thereof is not shown. Suffice it to say that the crank shaft 34 is journalled in an eccentric bore of a hub attached to the worm gear 112. The axis of rotation of the hub and gear 112 is depicted by numeral 113. The worm gear 112 is formed with a cam track 118 having a notch 120 and a ledge 122 formed with a second notch 124. The crank shaft 34 is drivingly connected to a plate 126 having a pair of diametrically opposed pins 128 and 130. A drive pawl 132 is pivotally supported on the pin 128 and a lock pawl 134 is pivotally supported on the pin 130. The drive pawl 132 has a cam follower pin 136 which rides in the cam track 118, and the lock pawl 134 has a pin 138 adapted to ride on the ledge 122 of the cam track 118. In addition, the drive pawl 132 is formed with an upstruck flange 140, and the ends of the drive and lock pawls are operatively interconnected by a compression spring 142. One end of the compression spring is attached to the lock pawl 134, and the other end thereof is attached to a lever 144 having an intermediate pivot 146 on the drive pawl 132. Pivotal movement of the lever 144 is limited by a pin 148 that extends through an arcuate slot 150 in the lever 144. The lever 144 has an upstruck flange 152, the purpose of which will be described hereinafter.

During running operation when the wiper blades 22 and 24 are oscillated throughout their strokes A and B, respectively, the pins 136 and 138 on the drive pawl 132 and the lock pawl 134 engage their respective notches 120 and 124. Hence, the crank shaft 34 will be connected for rotation with the worm gear 112 about the axis 113 thereof. During this time, the crank pin 38 on the crank arm 36 is rotated in its running orbit while the throw thereof remains fixed.

A valve body 154 is attached to the housing 114 by a pair of bolts 156. The valve body 154 has a pair of fittings 158 and 160 threadedly connected thereto by which conduits 162 and 80 are connected to the valve body. As seen particularly in FIGURES 3 and 4, the conduit 162 communicates with a chamber 164 formed between the valve body and the housing 114. A suitable gasket 166 is disposed between the valve body 154 and the housing 114. The valve body has a bore 168 communicating with the chamber 164 and a passage 170 extending transversely of the bore 168 and intersecting the same. The passage 170 connects with the conduit 80. A second passage 172 intersects the passage 170 and a third passage 174 intersects the passage 172.

Hydraulic fluid under pressure from any suitable source is supplied to the conduit 162 and the chamber 164. A reciprocable valve element 176 having a throttling surface 178 and a sealing land 180 is disposed in the bore 168. The rate of fluid flow from the chamber 164 to the conduit 80 is controlled by the position of the valve 176 since the throttling surface 178 constitutes a variable restriction in the passage 170. The valve element 176 is connected to a slider 182 supported for reciprocable movement in the housing 114 and having a flange portion 184. One end of a Bowden cable 186 is secured to the slider 182, the housing of the Bowden cable being securely attached to the housing 188 by a bolt 190. The Bowden cable 186 can be controlled by the vehicle operator through an instrument panel mounted knob in a manner well known in the art. The valve element 176 is shown in partially open position in FIGURE 3 wherein communication between the conduit 80 and the chamber 164 is controlled by throttling surface 178 of the valve 176.

The conduit 80 can also be connected to the chamber 164 through passages 174 and 172. A reciprocable parking valve 192 is disposed in the passage 172, the parking valve 192 having a valve head 194 and an annular groove 196. One end 200 of the U-shaped spring 198, disposed in the passage 174, is bifurcated and engages the annular groove 196 in the parking valve 192. The other end 202 of the U-shaped spring 198 is also bifurcated to permit movement of the valve head 194 therethrough. The spring 198 normally maintains the parking valve 192 in the position depicted in FIGURE 4 wherein the chamber 164 communicates with passage 170 and the conduit 80 through passage 174 and passage 172 thus by-passing the manual valve 176. When the parking valve is closed, the valve head 194 closes the end of passage 172.

Referring again to FIGURES 2 and 7, a stop member 204 is rigidly attached to the housing 114 by a screw 206. The stop member 204 is formed with a notch 208 having a chambered entrance wall 210 and a resilient sleeve 212 attached to the other wall. A latch arm 214 is pivotally mounted intermediate its ends on a pin 216 carried by the stop 204. The latch arm has an end 218 engageable with the flanged end 140 of the drive pawl 132. The other end of the latch arm 214 has a cam surface 220 which coacts with the flange 184 on the slider 182. The end 218 of the latch arm 214 is movable into and out of the path of rotation of the end 140 of the drive pawl 132. In addition, the latch arm 214 is biased in the counterclockwise direction about its pivot 216 by a compression spring 222, one end of which is secured to the latch arm 214 and the other end of which is secured to the stop 204. When the slider 182 is in the running position, as depicted in FIGURE 2, the cam surface 220 on the latch arm 214 engages the flange 184 on the slider which imparts clockwise movement to the latch arm 214 so as to withdraw the end 218 of the latch arm from the path of movement of the end 140 on the drive pawl 132. However, when the slider 182 is moved to the "off" position, as viewed in FIGURE 7, the flange 184 is disengaged from the cam surface 220 thereby permitting the spring 222 to impart counterclockwise pivotal movement to the latch arm 214. Counterclockwise pivotal movement of the latch arm 214 is limited by engagement of the cam surface 220 with the flange 184 of the slider 182. The latch arm 214 is formed with a rib 224 constituting a bearing surface between the latch 214 and the stop 204.

When the slider 182 is in the running position as shown in FIGURE 2, the crank shaft 34 and the plate are connected for rotation with the worm gear 112 since the pins 136 and 138 on the drive and lock pawls are engaged with their respective notches 120 and 124. During these conditions, the shaft 34 will be driven about the axis 113 of the worm gear so as to impart rotation to the crank arm 36 which will impart a symmetrical oscillation to the wiper blades 22 and 24 throughout their running strokes A and B, respectively. The speed of rotation of the worm gear can be infinitely varied by adjusting the position of the valve element 176 to increase or reduce the flow of hydraulic fluid under pressure from the conduit 162 to the conduit 80 and thence to the gear port 84 of the hydraulic motor 26.

When the slider 182 is moved to the position of FIGURE 7, the wiper motor continues to rotate since hydraulic fluid is supplied to the gear port 84 through passages 174 and 172 and the conduit 80. Concurrently with closure of the valve 176, the latch arm 214 will be pivoted in the counterclockwise direction from the position of FIGURE 2 to the position of FIGURE 7 so that the end 218 thereof intersects the path of movement of the end 140 of the drive pawl 132. At a predetermined angular position of the drive pawl 132, the flange 140 engages the end 218 of the latch 214, such that during continued rotation of the worm gear 112 the drive pins 136 and 138 are withdrawn from their respective notches 120 and 124. This interrupts the driving connection between the plate 126 and the worm gear 112. However, due to the configuration of the cam track 118 the plate 126 and the shaft 34 moves throughout a small angle in the counterclockwise direction during rotation of the worm gear 112 from the position of FIGURE 2 to the position of FIGURE 7.

During relative rotation between the worm gear and the plate 132, the throw of the crank is increased due to the eccentric relationship between the shaft 34 and the hub of the worm gear. Thus, the shaft 34 is shifted laterally relative to the housing 114 from the position of FIGURE 2 to the position of FIGURE 7. During this movement the flange 140 of the drive pawl 132 moves into the notch 208 of the stop plate 204. Concurrently, the flange 152 of the lever 144 engages the end of the parking valve 192 so as to interrupt communication between passages 174 and 172 thereby cutting off the flow of hydraulic fluid under pressure from the port chamber 84 to the conduits 80. In this manner, rotation of the wiper motor 26 is arrested with the wiper blades 22 and 24 in their depressed parked positions. The arcuate slot 150 in the lever 144 is arranged to permit the lever 144 to pivot about the pin 146 after the valve head 194 engages its valve seat. This arrangement prevents damage to the several parts which would otherwise occur due to overtravel.

When it is desired to operate the wipers, the slider 182 is moved upwardly, as viewed in FIGURE 7, whereupon the flange 184 on the slider will engage the cam surface 220 and pivot the latch arm 204 in the clockwise direction. at the same time, the valve element 175 is opened thereby interconnecting the chamber 164 with the conduit 80 so as to supply hydraulic fluid under pressure to the motor chamber 66. During the first 180° rotation of the worm gear 112 by the hydraulic motor 26, the worm gear 112 will rotate relative to the plate 126 and the shaft 34 therebey shifting the shaft 34 laterally from the position of FIGURE 7 to the position of FIGURE 2. During this movement, the coaction between the cam track 118 and the pin 136 will withdraw the end 140 of the drive pawl 132 from the notch 208 in the stop member 204 so that when the pins 136 and 138 are aligned with their respective notches 120 and 124, spring 142 will effect reengagement of the drive pins with their respective notches to reestablish driving connection between the plate 126 and the worm gear 112. In addition, the lever 144 is disengaged from the parking valve 192 thereby permitting the spring 198 to open the same.

While the embodiment of the invention as herein disclosed constitutes a preferred form, it is to be understood that other forms might be adopted.

What is claimed is as follows:

1. Windshield wiper actuating mechanism including, a fluid motor having a rotary driving member, means to supply fluid under pressure to said motor to impart rotation to said driving member, crank means having an interruptible driving connection with said driving member, means operable to interrupt the driving connection between said crank means and said driving member whereby rotation of said driving member relative to said crank means varies the throw of said crank means, and means automatically operable to interrupt the supply of fluid under pressure to said motor when the throw of said crank means is a maximum.

2. Windshield wiper actuating means including, a fluid motor having a rotary driving member, a manual control valve for throttling the flow of pressure fluid to said motor so as to control the speed of rotation of said driving member, a driven member having an interruptible driving connection with said driving member, means operable to interrupt the driving connection between said members, a parking valve connected in parallel with said manual control valve, and means operable to automatically close said parking valve after interruption of the driving connection between said members during rotation of said driving member relative to said driven member when said manual control valve is closed.

3. Windshield wiper actuating means including, a fluid motor having a rotary driving member, a manual control valve for throttling the flow of pressure fluid to said motor so as to control the speed of rotation of said driving member, crank means having an interruptible driving connection with said driving member, a parking valve connected in parallel with said manual control valve, means operable to interrupt the driving connection between said crank means and said driving member to vary the throw of said crank means during relative rotation between said driving member and said crank means and simultaneously close said manual control valve, and means operable to automatically close said parking valve when the throw of said crank means is a maximum.

4. Windshiled wiper actuating mechanism including, a fluid motor comprising a cylinder having a rotor disposed therein capable of continuous rotation by the application of fluid under pressure to said cylinder, a manual control valve for throttling the flow of said pressure fluid to said cylinder so as to control the speed of rotation of said rotor, a worm gear drivingly connected with said rotor, a rotatable driven member having an interruptible driving connection with said worm gear, means operable to interrupt the driving connection between said driven member and said worm gear, a parking valve connected in parallel with said manual control valve, and cam means automatically operable to close said parking valve during relative rotation between said worm gear and said driven member after interruption of the driving connection therebetween when said manual control valve is closed.

5. Windshield wiper actuating mechanism including, a fluid motor comprising a cylinder having a rotor disposed therein capable of continuous rotation by the application of fluid under pressure to said cylinder, a manual control valve for throttling the flow of pressure fluid to said cylinder so as to control the speed or rotation of said rotor, a worm gear drivingly connected with said rotor, a rotatable driven member having an interruptible dirving connection with said worm gear, a parking valve connected in parallel with said manual control valve, means operable to interrupt the driving connection between said driven member and said worm gear and simultaneously close said manual control valve, and cam means automatically operable during relative rotation between said worm gear and said driven member for closing said parking valve.

6. The actuating mechanism set forth in claim 5 wherein said rotor comprises an internally toothed gear, and wherein said motor includes a stationary reaction gear having less teeth than said rotor in meshing engagement with said rotor.

7. The actuating mechanism set forth in claim 6 wherein said motor includes a toothed drive cap having the same number of teeth as said rotor in meshing engagement therewith.

8. The actuating mechanism set forth in claim 5 wherein said parking valve comprises a reciprocable plunger, and spring means constantly acting on said plunger for maintaining it in the open position.

9. The actuating mechanism set forth in claim 5 wherein said cam means comprises a cam track in said worm gear, wherein said interruptible driving connection between said driven member and said worm gear includes a pawl, and wherein said cam means actuates said pawl to close said parking valve.

10. The actuating mechanism set forth in claim 5 wherein said manual control valve comprises a reciprocable plunger, a slider connected to said plunger for reciprocating the same and having a flange, and wherein the means operable to interrupt the driving connection between said driven member and said worm gear comprises a latch arm having a cam surface coacting with said flange.

11. The actuating mechanism set forth in claim 10 wherein said latch arm is pivotally mounted intermediate its ends, resilient means biasing said latch arm in one direction about said pivot, and wherein said cam surface is disengaged from said flange by movement of said manual control valve to the closed position.

References Cited in the file of this patent
UNITED STATES PATENTS

| | | |
|---|---|---|
| 1,341,846 | Gollings | June 1, 1920 |
| 1,505,707 | Hill | Aug. 19, 1924 |
| 1,825,418 | Pfeiffer et al. | Sept. 29, 1931 |
| 2,173,447 | Horton | Sept. 19, 1939 |
| 2,564,982 | Lane | Aug. 21, 1951 |
| 2,566,261 | Torkelson | Aug. 28, 1951 |
| 2,667,249 | Bell et al. | Jan. 26, 1954 |
| 2,727,598 | Mitchell et al. | Dec. 20, 1955 |
| 2,753,023 | Marvin | July 3, 1956 |
| 2,838,956 | Schneider | June 17, 1958 |
| 2,861,457 | Harrison | Nov. 25, 1958 |
| 2,866,344 | Reese | Dec. 30, 1958 |
| 2,964,151 | Eckman | Dec. 14, 1960 |
| 2,973,067 | Eddy | Feb. 28, 1961 |
| 2,973,068 | Sturrock | Feb. 28, 1961 |
| 2,985,024 | Contant et al. | May 23, 1961 |